(12) United States Patent
Park et al.

(10) Patent No.: US 12,043,879 B2
(45) Date of Patent: Jul. 23, 2024

(54) STEEL CORD AND SINGLE STEEL WIRE HAVING EXCELLENT STRAIGHTNESS QUALITY FOR REINFORCING TIRE AND MANUFACTURING METHOD THEREOF

(71) Applicant: Hongduk Industrial Co., Ltd., Pohang-si (KR)

(72) Inventors: Pyeong Yeol Park, Pohang-si (KR); Do Hun Kim, Yangsan-si (KR)

(73) Assignee: Hongduk Industrial Co., Ltd., Pohang-si (KR)

( * ) Notice: Subject to any disclaimer, the term of this patent is extended or adjusted under 35 U.S.C. 154(b) by 11 days.

(21) Appl. No.: 18/131,630

(22) Filed: Apr. 6, 2023

(65) Prior Publication Data

US 2023/0332263 A1    Oct. 19, 2023

Related U.S. Application Data

(63) Continuation of application No. 16/623,044, filed as application No. PCT/KR2018/003217 on Mar. 20, 2018, now abandoned.

(30) Foreign Application Priority Data

Jul. 17, 2017    (KR) ........................ 10-2017-0090378

(51) Int. Cl.
  *C21D 9/52*    (2006.01)
  *B21F 9/00*    (2006.01)
  *B60C 9/00*    (2006.01)
(52) U.S. Cl.
  CPC ................. *C21D 9/52* (2013.01); *B21F 9/00* (2013.01); *B60C 9/0007* (2013.01)
(58) Field of Classification Search
  None
  See application file for complete search history.

(56) References Cited

U.S. PATENT DOCUMENTS 3,196,052 A    7/1965    Hann
3,548,624 A    12/1970    Hann et al.
(Continued)

FOREIGN PATENT DOCUMENTS

CN    103347636 A    10/2013
CN    106283307 A    1/2017
(Continued)

OTHER PUBLICATIONS

Machine Translation of JPH-08155569-A (Year: 1996).*
(Continued)

*Primary Examiner* — Keith Walker
*Assistant Examiner* — Ryan L Heckman
(74) *Attorney, Agent, or Firm* — McCarter & English, LLP

(57) ABSTRACT

Provided are a steel cord and a single steel wire having excellent straightness quality for reinforcing tire and a method of manufacturing the steel cord and single steel wire. The steel cord and the single steel wire include a wire undergoing through a drawing process, a heating process performed in a state in which tension is applied to the wire, and a cooling process; and a winding portion on which the wire is wound, the winding portion having a diameter greater than a diameter of the wire, wherein, when an end of the wire that has been wound on the winding portion for six months to one year is fixed on a point and the wire is pulled down vertically to 400 mm, a distance between a first axis that is perpendicular to the point and an opposite end of the wire is 30 mm or less. The method of manufacturing the steel cord and single steel wire having excellent straightness quality for reinforcing tire includes: a wire preparing process, a heating process, a cooling process, and a winding process.

2 Claims, 13 Drawing Sheets

(56) References Cited

U.S. PATENT DOCUMENTS

| | | | |
|---|---|---|---|
| 3,847,002 | A | 11/1974 | Suzuki et al. |
| 4,938,811 | A | 7/1990 | Murai et al. |
| 6,082,163 | A * | 7/2000 | Hara .................. B21C 1/06 |
| | | | 72/289 |
| 6,508,803 | B1 | 1/2003 | Horikawa et al. |
| 9,545,681 | B2 | 1/2017 | Liu et al. |
| 9,617,663 | B2 | 4/2017 | Jeon et al. |
| 10,131,966 | B2 | 11/2018 | Morisot et al. |
| 2004/0060619 | A1 | 4/2004 | Sakata et al. |

FOREIGN PATENT DOCUMENTS

| | | | |
|---|---|---|---|
| JP | S 52-111459 A | | 9/1977 |
| JP | H 08-155569 A | | 6/1996 |
| JP | H-08155569 A | * | 6/1996 |
| JP | H 10-238530 A | | 9/1998 |
| JP | 2003-253342 A | | 9/2003 |
| JP | 2003253342 A | * | 9/2003 |
| JP | 2005-297045 A | | 10/2005 |
| JP | 2005297045 A | * | 10/2005 |
| JP | 4824960 B2 | | 11/2011 |
| JP | 2016-056438 A | | 4/2016 |
| KR | 2005-0011601 A | | 1/2005 |
| KR | 2005-0100219 A | | 10/2005 |
| KR | 10-1152415 B1 | | 5/2012 |
| KR | 10-2015-0104475 A | | 9/2015 |
| KR | 10-2016-0124812 A | | 10/2016 |

OTHER PUBLICATIONS

Machine Translation of JP-2003253342-A (Year: 2003).*
Machine Translation of JP-2005297045-A (Year: 2005).*
Preliminary Examination Report prepared by Brazilian Patent Office for corresponding Brazilian application BR 11 2019 026541-4 with English translation. The report was published in Brazilian Patent Office's INPI Journal 2690, dated Jul. 26, 2022.
Extended European Search Report prepared for corresponding European Application 18834931.0, dated Nov. 10, 2020.
International Search Report and Written Opinion prepared by the Korean Intellectual Property Office, acting as the International Search Authority, for international application PCT/KR2018/003217 mailed Jun. 28, 2018.

* cited by examiner

FIG. 11

| TENSION (kgf) | | 0.5 | | | | | | | | | | | | |
|---|---|---|---|---|---|---|---|---|---|---|---|---|---|---|
| HEATING TEMPERATURE (°C) | | 50 | | 75 | | | 100 | | | 125 | | 150 | | 200 |
| TIME (s) | 900 | 1800 | 150 | 300 | 150 | 300 | 20 | 45 | 4 | 8 | 1 | 2 | 1 | 2 |
| CONDITION(A) | 417.3 | 426.8 | 417.8 | 427.3 | 415.3 | 426.4 | 418.3 | 427.8 | 424.4 | 433.8 | 474.4 | 483.8 |
| STRAIGHTNESS (mm) RIGHT AFTER MANUFACTURE | 10 | 10 | 10 | 10 | 10 | 10 | 10 | 10 | 10 | 10 | 10 | 10 |
| AFTER ONE MONTH | 51 | 28 | 36 | 18 | 20 | 28 | 53 | 24 | 27 | 12 | 7 | 5 |
| AFTER SEVEN MONTHS | 89 | 54 | 65 | 42 | 65 | 50 | 75 | 50 | 41 | 32 | 20 | 18 |
| CHANGE IN STRAIGHTNESS | 79 | 44 | 55 | 32 | 55 | 40 | 65 | 40 | 31 | 22 | 10 | 8 |

| TENSION (kgf) | | 1 | | | | | | | | | | | | |
|---|---|---|---|---|---|---|---|---|---|---|---|---|---|---|
| HEATING TEMPERATURE (°C) | | 50 | | 75 | | | 100 | | | 125 | | 150 | | 200 |
| TIME (s) | 900 | 1800 | 150 | 300 | 150 | 300 | 20 | 45 | 4 | 8 | 1 | 2 | 1 | 2 |
| CONDITION(A) | 418.7 | 428.2 | 419.2 | 428.7 | 416.7 | 427.7 | 419.7 | 429.1 | 425.7 | 435.2 | 475.7 | 485.2 |
| STRAIGHTNESS (mm) RIGHT AFTER MANUFACTURE | 10 | 10 | 10 | 10 | 10 | 10 | 10 | 10 | 10 | 10 | 10 | 10 |
| AFTER ONE MONTH | 43 | 22 | 35 | 23 | 46 | 24 | 28 | 16 | 18 | 9 | 6 | 5 |
| AFTER SEVEN MONTHS | 72 | 45 | 70 | 42 | 84 | 50 | 50 | 35 | 34 | 25 | 28 | 24 |
| CHANGE IN STRAIGHTNESS | 62 | 35 | 60 | 32 | 74 | 40 | 40 | 25 | 24 | 15 | 18 | 14 |

| TENSION (kgf) | | 2 | | | | | | | | | | | | |
|---|---|---|---|---|---|---|---|---|---|---|---|---|---|---|
| HEATING TEMPERATURE (°C) | | 50 | | 75 | | | 100 | | | 125 | | 150 | | 200 |
| TIME (s) | 900 | 1800 | 150 | 300 | 150 | 300 | 20 | 45 | 4 | 8 | 1 | 2 | 1 | 2 |
| CONDITION(A) | 421.4 | 430.9 | 421.9 | 431.4 | 419.4 | 430.4 | 422.4 | 431.8 | 428.4 | 437.9 | 478.4 | 487.9 |
| STRAIGHTNESS (mm) RIGHT AFTER MANUFACTURE | 10 | 10 | 10 | 10 | 10 | 10 | 10 | 10 | 10 | 10 | 10 | 10 |
| AFTER ONE MONTH | 30 | 16 | 40 | 13 | 25 | 15 | 27 | 14 | 26 | 5 | 7 | 7 |
| AFTER SEVEN MONTHS | 54 | 29 | 75 | 38 | 40 | 28 | 56 | 28 | 40 | 22 | 22 | 18 |
| CHANGE IN STRAIGHTNESS | 44 | 19 | 65 | 28 | 30 | 18 | 46 | 18 | 30 | 12 | 12 | 8 |

| TENSION (kgf) | | 4 | | | | | | | | | | | | |
|---|---|---|---|---|---|---|---|---|---|---|---|---|---|---|
| HEATING TEMPERATURE (°C) | | 50 | | 75 | | | 100 | | | 125 | | 150 | | 200 |
| TIME (s) | 900 | 1800 | 150 | 300 | 150 | 300 | 20 | 45 | 4 | 8 | 1 | 2 | 1 | 2 |
| CONDITION(A) | 426.8 | 436.3 | 427.3 | 436.8 | 424.8 | 435.8 | 427.8 | 437.2 | 433.8 | 443.3 | 483.8 | 493.3 |
| STRAIGHTNESS (mm) RIGHT AFTER MANUFACTURE | 10 | 10 | 10 | 10 | 10 | 10 | 10 | 10 | 10 | 10 | 10 | 10 |
| AFTER ONE MONTH | 19 | 9 | 20 | 11 | 42 | 10 | 20 | 10 | 16 | 5 | 6 | 4 |
| AFTER SEVEN MONTHS | 35 | 20 | 35 | 26 | 70 | 20 | 32 | 22 | 30 | 15 | 16 | 15 |
| CHANGE IN STRAIGHTNESS | 25 | 10 | 25 | 16 | 60 | 10 | 22 | 12 | 20 | 5 | 6 | 5 |

FIG. 12

| TENSION (kgf) | 6 | | | | | | | | | | | |
|---|---|---|---|---|---|---|---|---|---|---|---|---|
| HEATING TEMPERATURE (°C) | 50 | | 75 | | 100 | | 125 | | 150 | | 200 | |
| TIME (s) | 900 | 1800 | 150 | 300 | 20 | 45 | 4 | 8 | 1 | 2 | 1 | 2 |
| CONDITION (A) | 432.2 | 441.7 | 432.7 | 442.2 | 430.2 | 441.2 | 433.2 | 442.6 | 439.2 | 461.2 | 489.2 | 498.7 |
| STRAIGHTNESS (mm) — RIGHT AFTER MANUFACTURE | 10 | 10 | 10 | 10 | 10 | 10 | 10 | 10 | 10 | 10 | 10 | 10 |
| STRAIGHTNESS (mm) — AFTER ONE MONTH | 13 | 8 | 15 | 10 | 17 | 7 | 6 | 8 | 8 | 5 | 5 | 5 |
| STRAIGHTNESS (mm) — AFTER SEVEN MONTHS | 30 | 19 | 30 | 20 | 38 | 20 | 18 | 20 | 20 | 15 | 15 | 15 |
| STRAIGHTNESS (mm) — CHANGE IN STRAIGHTNESS | 20 | 9 | 20 | 10 | 28 | 10 | 8 | 10 | 10 | 5 | 5 | 5 |

| TENSION (kgf) | 8 | | | | | | | | | | | |
|---|---|---|---|---|---|---|---|---|---|---|---|---|
| HEATING TEMPERATURE (°C) | 50 | | 75 | | 100 | | 125 | | 150 | | 200 | |
| TIME (s) | 900 | 1800 | 150 | 300 | 20 | 45 | 4 | 8 | 1 | 2 | 1 | 2 |
| CONDITION (A) | 437.6 | 447.1 | 438.1 | 447.6 | 435.6 | 446.6 | 438.6 | 448 | 444.6 | 454.1 | 494.6 | 504.1 |
| STRAIGHTNESS (mm) — RIGHT AFTER MANUFACTURE | 10 | 10 | 10 | 10 | 10 | 10 | 10 | 10 | 10 | 10 | 10 | 10 |
| STRAIGHTNESS (mm) — AFTER ONE MONTH | 10 | 9 | 7 | 9 | 8 | 6 | 7 | 7 | 7 | 9 | 5 | 6 |
| STRAIGHTNESS (mm) — AFTER SEVEN MONTHS | 24 | 20 | 20 | 22 | 20 | 15 | 16 | 15 | 15 | 20 | 20 | 15 |
| STRAIGHTNESS (mm) — CHANGE IN STRAIGHTNESS | 14 | 10 | 10 | 12 | 10 | 5 | 6 | 5 | 5 | 10 | 10 | 5 |

| TENSION (kgf) | 10 | | | | | | | | | | | |
|---|---|---|---|---|---|---|---|---|---|---|---|---|
| HEATING TEMPERATURE (°C) | 50 | | 75 | | 100 | | 125 | | 150 | | 200 | |
| TIME (s) | 150 | 300 | 25 | 50 | 5 | 10 | 1 | 2 | 1 | 2 | 1 | 2 |
| CONDITION (A) | 418.5 | 428 | 419 | 428.5 | 422 | 431.5 | 425 | 434.5 | 450 | 459.5 | 500.0 | 509.5 |
| STRAIGHTNESS (mm) — RIGHT AFTER MANUFACTURE | 10 | 10 | 10 | 10 | 10 | 10 | 10 | 10 | 10 | 10 | 10 | 10 |
| STRAIGHTNESS (mm) — AFTER ONE MONTH | 40 | 16 | 38 | 15 | 29 | 13 | 17 | 14 | 7 | 8 | 5 | 5 |
| STRAIGHTNESS (mm) — AFTER SEVEN MONTHS | 76 | 30 | 70 | 35 | 48 | 29 | 25 | 25 | 20 | 16 | 12 | 12 |
| STRAIGHTNESS (mm) — CHANGE IN STRAIGHTNESS | 66 | 20 | 60 | 25 | 38 | 19 | 15 | 15 | 10 | 6 | 2 | 2 |

FIG. 13

| PRODUCTS | HEATING PROCESS CONDITION | AFTER DRAWING | ONE WEEK | TWO WEEK | THREE WEEK | ONE MONTH | TWO MONTH | THREE MONTH | FOUR MONTH | FIVE MONTH | SIX MONTH | SEVEN MONTH |
|---|---|---|---|---|---|---|---|---|---|---|---|---|
| RELATED ART | NOT PERFORMED | 10 | 66 | 84 | 98 | 105 | 114 | 128 | 130 | 136 | 152 | 152 |
| PRODUCT OF DISCLOSURE | 4kgf, 150°C, 2s | 10 | 5 | 7 | 7 | 7 | 10 | 12 | 12 | 12 | 15 | 15 |

STEEL CORD AND SINGLE STEEL WIRE HAVING EXCELLENT STRAIGHTNESS QUALITY FOR REINFORCING TIRE AND MANUFACTURING METHOD THEREOF

CROSS-REFERENCE TO RELATED APPLICATIONS

This application is a continuation of U.S. patent application Ser. No. 16/623,044 filed Dec. 16, 2019, which is the National Stage entry under 35 U.S.C. § 371 of International Application Number PCT/KR2018/003217 filed on Mar. 20, 2018, published on Jan. 24, 2019 under publication number WO 2019/017559 A1, which claims the benefit of priority under 35 U.S.C. § 119 of Korean patent application number 10-2017-0090378 filed Jul. 17, 2017.

TECHNICAL FIELD

One or more embodiments of the disclosure relate to a steel cord and a single steel wire having excellent straightness quality for reinforcing tire and a method of manufacturing the same, and more particularly, to a steel cord and a single steel wire having excellent straightness quality for reinforcing tire, which are capable of accelerating strain aging of the steel cord and the single steel wire and improving straightness quality after aging by heating and cooling down the steel cord and the single steel wire to remove stress remaining in the steel cord and the single steel wire, and a method of manufacturing the steel cord and the single steel wire.

BACKGROUND ART

In general, a steel cord and a single steel wire are used to reinforce elastomers such as tires for vehicles, industrial belts, etc. In particular, a steel cord and a single steel wire used to reinforce tire are demanded to meet various quality criteria in order to function as a reinforcing material in rubber.

It takes a few months to use a steel cord and a single steel wire as a tire reinforcing material. That is, the steel cord and the single steel wire are wound on a spool having a certain inner diameter and used a few months later. Based on the characteristics of the steel cord and the single steel wire, that is, using the steel cord and the single steel wire a few months after the winding, the straightness of the steel cord and the single steel wire is a significant characteristic of the steel cord and the single steel wire for reinforcing tire. That is, inferior straightness affects work processability during manufacturing of the tire and generates a buckling effect and a tip rising effect, and thus, there may be an issue during rolling and cutting processes of a tire manufacturer.

The straightness of the steel cord and the single steel wire may be changed due to following causes. The steel cord and the single steel wire include carbon steel of 0.5 to 1.1C wt %. In the carbon steel, interstitial solid atoms C and N are diffused over time and moved and fixed to adjacent dislocations. Therefore, when the steel cord and the single steel wire are manufactured and wound on a spool having a certain inner diameter, the straightness of the steel cord and the single steel wire changes due to the diffusion and fixation of the C and N atoms and the straightness quality degrades.

According to the steel cord and the single steel wire of the related art, the steel cord and the single steel wire having excellent straightness quality after aging may not be provided. That is, even though the steel cord and the single steel wire according to the related art have excellent straightness at an initial stage of manufacturing, when a long period of time passes in a state in which the steel cord and the single steel wire are wound on the spool having a certain inner diameter, the straightness changes due to the strain aging under the stress within an elastic region and it is difficult to satisfy the straightness quality.

DESCRIPTION OF EMBODIMENTS

Technical Problem

One or more embodiments of the disclosure relate to a steel cord and a single steel wire having an excellent straightness quality for reinforcing tire, the steel cord and the single steel wire may have an improved straightness quality after being aged by heating and cooling down the steel cord and the single steel wire in order to remove stress remaining in the steel cord and the single steel wire and to promote strain aging of the steel cord and the single steel wire, and a method of manufacturing the steel cord and the single steel wire.

Solution to Problem

According to an aspect of the disclosure, a steel cord and a single steel wire having excellent straightness quality for reinforcing tire, the steel cord and the single steel wire includes: a wire undergoing through a drawing process, a heating process performed in a state in which tension is applied to the wire, and a cooling process; and a winding portion on which the wire is wound, the winding portion having a diameter greater than a diameter of the wire, wherein, when an end of the wire that has been wound on the winding portion for six months to one year is fixed on a point and the wire is pulled down vertically to 400 mm, and a distance between a first axis that is perpendicular to the point and an opposite end of the wire is 30 mm or less.

A heating temperature in the heating process is 200° C. or less, and a cooling temperature in the cooling process is 40° C. or less. The heating temperature, a heating time, and the tension applied to the wire during the heating process satisfy condition A below: condition (A): $T+13.67 \ln(t)+2.7\tau \geq 425$ (In condition (A), T is an absolute temperature K of the heating temperature, t denotes the heating time s, and $\tau$ is the tension (kgf) applied to the wire).

According to another aspect of the disclosure, a method of manufacturing a steel cord and a single steel wire having excellent straightness quality for reinforcing tire includes: preparing a wire that has been drawn; heating the wire in a state in which tension is applied to the wire; cooling down the wire; and winding the wire on a winding portion having a diameter that is greater than a diameter of the wire.

The method may further include measuring straightness by fixing an end of the wire that has been wound on the winding portion for six months to one year at a point and pulling down the wire vertically to 400 mm, wherein, in the measuring of the straightness, a distance between a first axis that is perpendicular to the point and an opposite end of the wire is 30 mm or less.

A heating temperature in the heating of the wire is 200° C. or less, and a cooling temperature in the cooling of the wire is 40° C. or less. The heating temperature, a heating time, and the tension applied to the wire during the heating of the wire may satisfy condition A below: condition (A): $T+13.67 \ln(t)+2.7\tau \geq 425$ (In condition (A), T is an absolute temperature K of the heating temperature, t denotes the heating time s, and τ is the tension (kgf) applied to the wire).

Advantageous Effects of Disclosure

According to the disclosure, stress remaining in a steel cord and single steel wire is removed by heating and cooling down the steel cord and single steel wire, and thus the steel cord and single steel wire for reinforcing tire, wherein the steel cord and single steel wire have excellent straightness quality, that is, the straightness does not change even when the steel cord and the single steel wire are wound on a winding portion having a certain inner diameter for a long period of time, may be provided.

BRIEF DESCRIPTION OF DRAWINGS

FIGS. 11 and 12 are tables showing a variation in a straightness according to a heating temperature, a heating time, and tension applied to a wire.

FIG. 13 is a table showing a straightness of a steel cord according to an embodiment as compared with that of a steel cord according to the related art.

MODE OF DISCLOSURE

Figure 1:
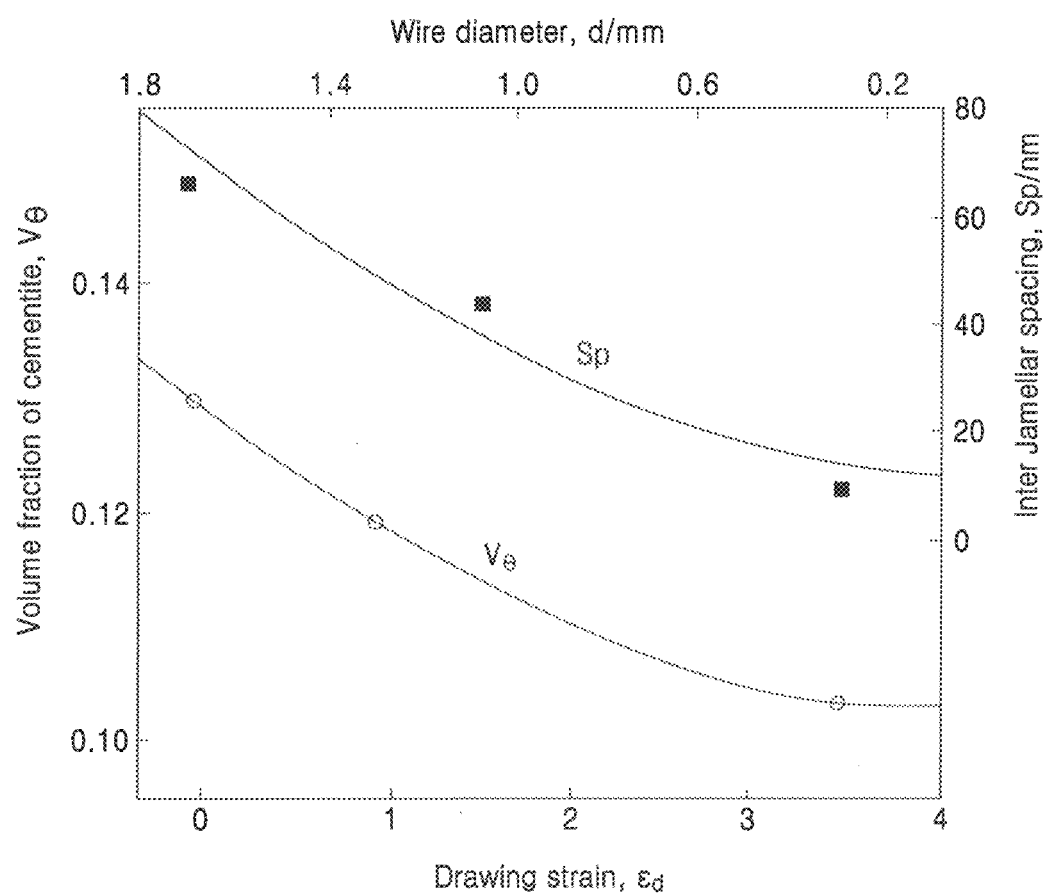
FIG. 1 is a graph of an influence of a drawing strain on cementite volume fraction and lamellar spacing.

One or more embodiments of the disclosure relate to a steel cord and a single steel wire having excellent straightness quality for reinforcing tire and a method of manufacturing the same, and more particularly, to a steel cord and a single steel wire having excellent straightness quality for reinforcing tire, which are capable of promoting strain aging of the steel cord and the single steel wire and improving straightness quality after aging by heating and cooling down the steel cord and the single steel wire to remove stress remaining in the steel cord and the single steel wire, and a method of manufacturing the steel cord and the single steel wire. One or more embodiments of the disclosure will be described in detail with reference to accompanying drawings.

The steel cord and single steel wire having excellent straightness quality for reinforcing tire according to the embodiment may include a wire 110 and a winding portion 120 on which the wire 110 may be wound.

The wire 110 undergoes through a drawing process, a heating process performed in a state in which tension is applied to the wire, and a cooling process. In detail, the wire 110 is a steel cord and single steel wire that may be used to reinforce tire, and may include 0.5 to 1.1 wt % of carbon steel.

Undergoing through the drawing process denotes that the wire 110 undergoes through a process including the drawing process. In detail, the wire 110 may be patented in order to ensure excellent strength and processability. When the wire 110 is patented, a pearlite microstructure that is an aggregate of cementite including a carbon component and ferrite including Fe may be obtained. A material that has been patented may undergo through a plating process for plating brass, a drawing process for drawing to 0.15 mm to 0.4 mm, and a stranding process for forming a steel cord by twisting one to several tens of wires (When the wire 110 is a single steel wire, the stranding process may not be performed.) The drawing process through which the wire 110 undergoes may denote any type of process provided that the process includes the drawing process.

The drawing process causes large deformation in a material and deforms a pearlite structure of high-carbon steel and accelerates decomposition of cementite in a lamellar layer. FIG. 1 is a graph of an influence of a drawing strain on cementite volume fraction and lamellar spacing. As the drawing strain increases, the lamellar spacing is linearly reduced and the cementite volume fraction decreases. This denotes that the cementite is decomposed while drawing the wire. Therefore, the cementite is decomposed due to the deformation generated during the drawing process and a fraction of C and N, that is, interstitial solid atoms, increases in a ferrite matrix phase.

Here, strain aging is shown when the interstitial solid atoms such as C, N, etc. are fixed at dislocations according to time, and factors thereof may include time, temperature, a density of dislocations, etc. as well as a density of the solid atoms. Moreover, dislocations of high density are in the material having a large plastic deformation through the drawing process, which further accelerates the aging.

That is, when the steel wire that has undergone the drawing process is wound on a spool having a certain inner diameter, the cementite is decomposed and strain aging occurs, and there is a change in the straightness and the target straightness may not be obtained.

The wire 110 undergoes through a drawing process, a heating process performed in a state in which tension is applied to the wire 110, and a cooling process, in order to artificially accelerate and finish diffusion of the solid atoms. As such, even after the wire 110 is wound on the winding portion 120 having a certain inner diameter, the aging may not occur. Here, the winding portion 120 may have a diameter that is greater than 300 times a diameter of the wire 110, and the wire 110 is wound thereon.

Preventing of the aging will be described in detail with reference to FIG. 2. That is, an end 111 of the wire 110 that has been wound on the winding portion 120 for six months to one year is fixed at a point 150, and then the wire 110 is pulled down vertically. Here, the wire 110 is pulled down to 400 mm. That is, a distance between the end 111 of the wire and an opposite end 112 of the wire 110 is 400 mm.

Whether the aging does not occur in the wire 110 may be determined based on a distance between a first axis 151 that is perpendicular to the point 150 and the opposite end 112 of the wire 110. In the steel cord and single steel wire for reinforcing tire according to the disclosure, the wire 110 that has undergone through the drawing process undergoes through the heating process and the cooling process, and thus the distance between the first axis 151 that is perpendicular to the point 150 and the opposite end 112 of the wire 110 is equal to or less than 30 mm.

A heating temperature is 200° C. or less in the heating process, in which the wire 110 is heated in a state where the tension is applied to the wire 110, and a cooling temperature after the heating of the wire 110 may be 40° C. or less, that is, room temperature. Here, the heating temperature may range from 50° C. to 200° C. and the cooling temperature may range from 10° C. to 40° C.

The heating temperature, the heating time, and the tension applied to the wire 110 during the heating process in which the wire 110 is heated may satisfy the following condition (A).

Condition (A): $T+13.67 \ln(t)+2.7\tau \geq 425$ (In condition (A), T is an absolute temperature K of the heating temperature, t denotes the heating time s, and $\tau$ is the tension (kgf) applied to the wire)

The heating process for heating the wire 110 and the cooling process for cooling down the heated wire 110 will be described in more detail in the method of manufacturing of the steel cord and the single steel wire having excellent straightness quality for reinforcing tire, which will be described later.

Figure 3:
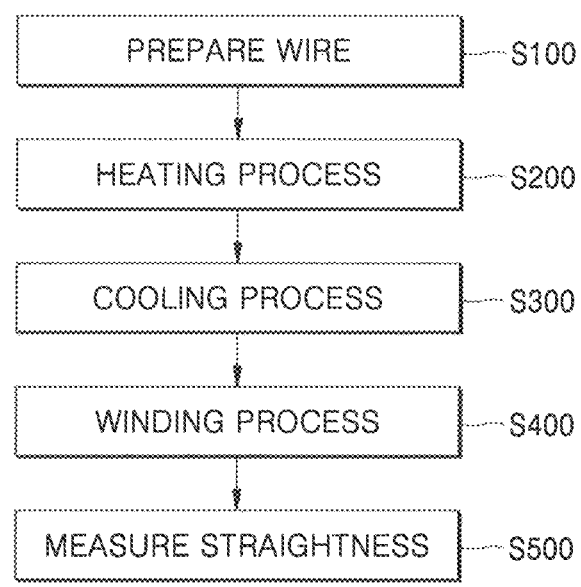
FIG. 3 is a processing diagram illustrating a method of manufacturing a steel cord and a single steel wire having an excellent straightness quality for reinforcing tire, according to an embodiment.

Referring to FIG. 3, the method of manufacturing the steel cord and single steel wire having excellent straightness quality for reinforcing tire may include preparing wire (S100), a heating process (S200), a cooling process (S300), a winding process (S400), and a measuring process of straightness (S500). (Here, the heating process S200 and the cooling process S300 correspond to the above-described process for heating the wire 100 and the process for cooling down the heated wire 110.) The process of preparing wire (S100) includes preparing a drawn wire.

The process of preparing wire (S100) may include various processes, provided that the process of drawing the wire 110 is included. The heating process S200 is a process for heating the drawn wire 110 in a state in which the tension is applied to the wire 110.

Figure 4:
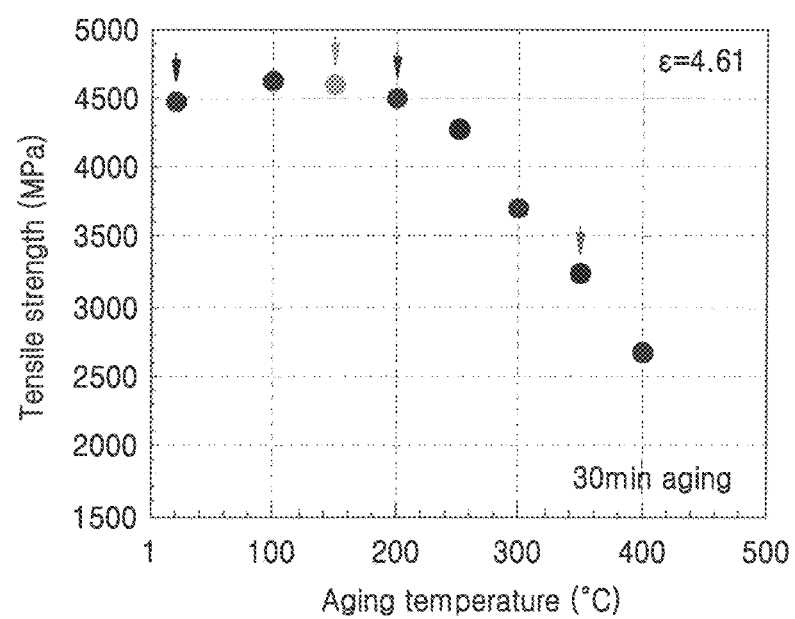
FIG. 4 is a diagram showing a variation in a tensile strength of a wire according to a heating temperature.
Figure 5A:
FIGS. 5A, 5B, 5C and 5D are pictures showing a variation in a microstructure of a wire according to a heating temperature.

FIG. 4 shows a variation in a tensile strength according to a heating temperature of the wire 110 that is drawn. Referring to FIG. 4, the tensile strength of the wire 110 is the maximum between a temperature range of 100° C. to 150° C. and is reduced at a temperature 200° C. or greater. The variation in the strength within the above temperature range is caused by a dislocation lock effect due to carbon atoms. Also, the reduction in the strength at the temperature of 200° C. or greater is caused due to recovery and recrystallization effects. FIG. 5A shows a change in a microstructure of the wire 110 that is not heated, and FIGS. 5B, 5C, and 5D respectively show changes in the microstructure of the wire 110 at the temperature of 150° C., 200° C., and 350° C., respectively.

Figure 5B:
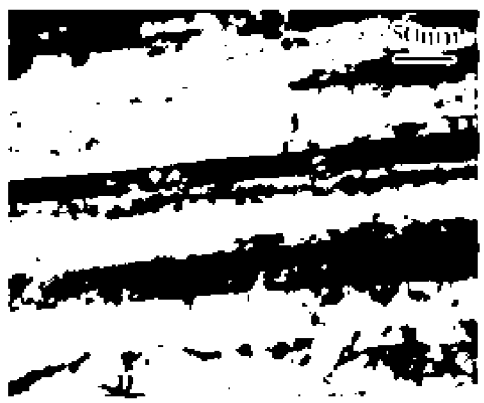
Figure 5C:
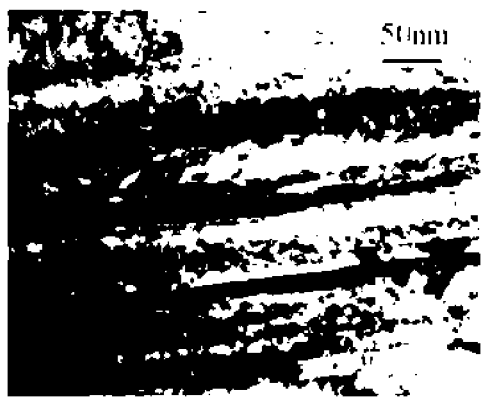
Figure 5D:

In FIGS. 5A to 5D, a bright portion denotes a ferrite layer including Fe and a dark portion denotes a cementite layer including $Fe_3C$. Pearlite has a structure, in which the ferrite layer including Fe and the cementite layer including $Fe_3C$ are alternately stacked as layers. Referring to FIGS. 5A to 5D, the microstructure of a drawn wire (FIG. 5A) shows the pearlite arranged in the drawing direction and is not noticeably different from the microstructures at the temperature of 200° C. or less (FIGS. 5B and 5C).

However, in the microstructure at the temperature of 350° C. (FIG. 5D), a lamellar layer of a round shape is observed, that is, a microstructure in recovery process is observed. The changes in the tensile strength and the microstructure shown in FIGS. 4 and 5A to 5B are exhibited due to the movement of carbon, and movement of the carbon and the dislocation fixing may be accelerated through the heating process.

In detail, when the wire 110 is heated at the temperature of 200° C. or less, the tensile strength may be increased without changing the microstructure largely. However, when the heating temperature is excessively higher than 200° C., a physical aspect of the wire deteriorates so that the change in the microstructure may be observed and the tensile strength decreases. That is, it may be understood that the temperature at which the heating effect may be sufficiently exhibited while showing a similar structure as that of not being heated may be 200° C. or less. FIGS. 6A to 9B are diagrams showing carbon distribution for each microstructure position according to the heating temperature by using a field ion microscopy (FIM) and an atom probe tomography (APT).

Figures 6A, 6B:
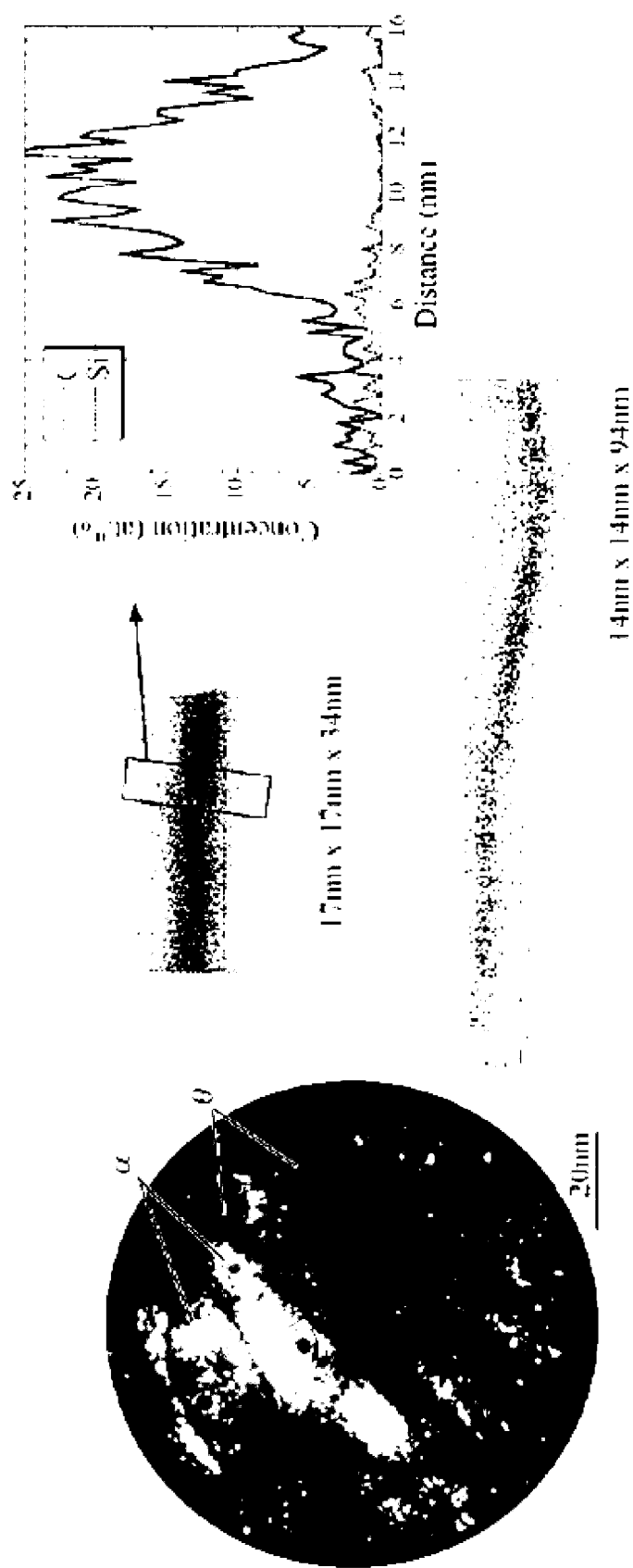
FIGS. 6A, 6B, 7A, 7B, 8A, 8B, 9A and 9B are diagrams showing carbon distribution for each microstructure position according to the heating temperature by using a field ion microscopy (FIM) and an atom probe tomography (APT).

FIGS. 6A, 7A, 8A, and 9A show FIM images according to the temperature, and FIGS. 6B, 7B, 8B, and 9B show distribution of carbons according to the temperature. In FIGS. 6A to 9B, a bright portion denotes ferrite and a dark portion denotes cementite. FIGS. 6A and 6B shows a state in which the drawing process is performed and the heating process is not performed, and the lamellar structure in which the ferrite and the cementite are clearly distinguished from each other is observed.

Figures 7A, 7B:
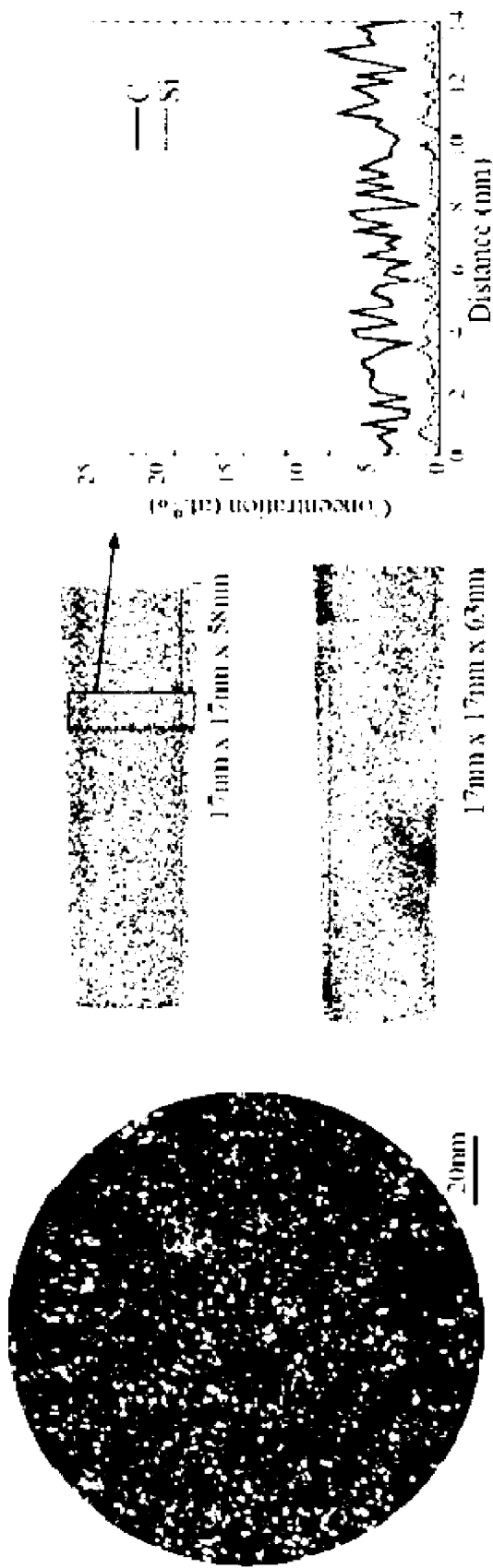

That is, right after the drawing, decomposition of the cementite is restricted. Here, restriction on the decomposition of the cementite denotes that the cementite is not decomposed in the wire that has undergone through the drawing process, and thus the cementite is decomposed when the wire is wound on the winding portion and accordingly the strain aging may occur. FIGS. 7A and 7B shows a state in which the drawing process is performed and then the heating process is performed at a temperature of 150° C.

Referring to FIGS. 7A and 7B, the bright portion and the dark portion are evenly arranged, and thus, carbon atoms are evenly distributed throughout the entire portions. Also, a concentration of the carbon is 4 to 5 at % which is identical with an average carbon content in the wire. (As described above, the wire may include 0.5 to 1.1 wt % of carbon steel, and FIGS. 6A to 9B shows that the wire includes 0.92 wt % of carbon steel. at %, that is, atomic %, denotes an atomic ratio for a certain element. 0.92 wt % may be converted into 4.5 at %, and thus the atomic ratio of the carbon in a base material (wire) of Fe on average is 4.5 at %. Referring to FIG. 7B, the atomic ratio of carbon is shown as 4 to 5 at % throughout the entire period, which denotes that the carbon atoms are evenly distributed in the base material (wire). That is, the wire is heated at the temperature of 150° C. after the drawing process, and then carbon atoms are moved and the aging effect may be accelerated by the heating process. Acceleration of the aging effect allows the wire to be aged through the heating process before being wound on the winding portion so that the aging may not occur later.

Figures 8A, 8B:
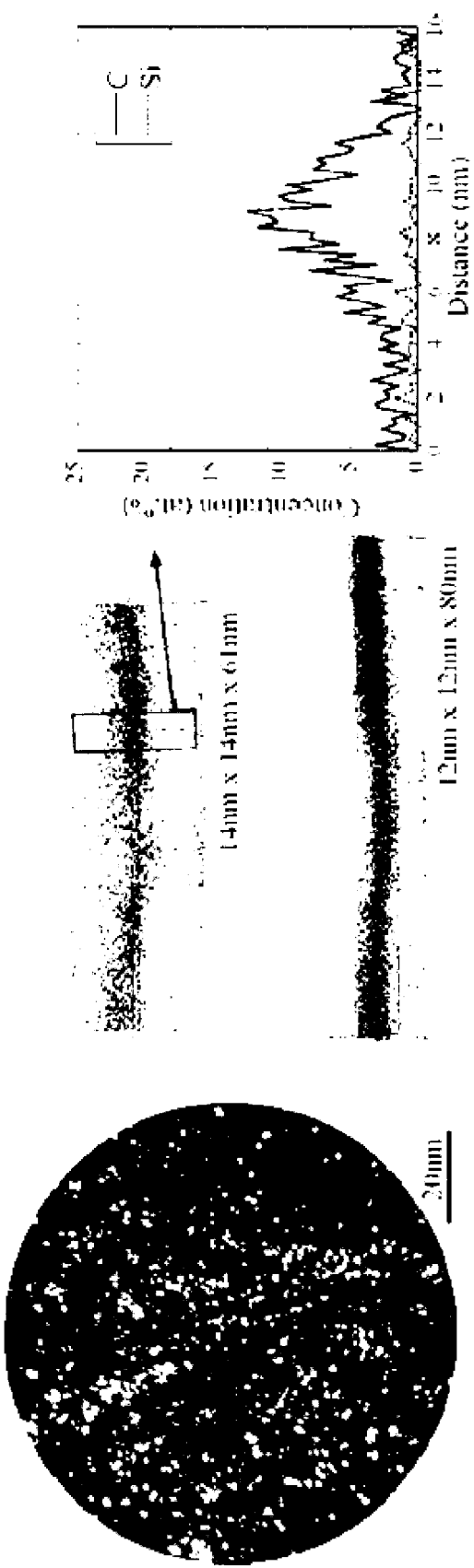

FIGS. 8A and 8B shows a state in which the heating process is performed at the temperature of 200° C. after the drawing process and shows uneven carbon distribution as compared with FIGS. 7A and 7B. A region with high carbon concentration has a carbon concentration lower than that of the cementite, that is, 25 at %, and a region with low carbon concentration has a carbon concentration, that is, 2 to 3 at %, which is lower than an average carbon concentration of a wire heated at the temperature of 150° C.

Figures 9A, 9B:
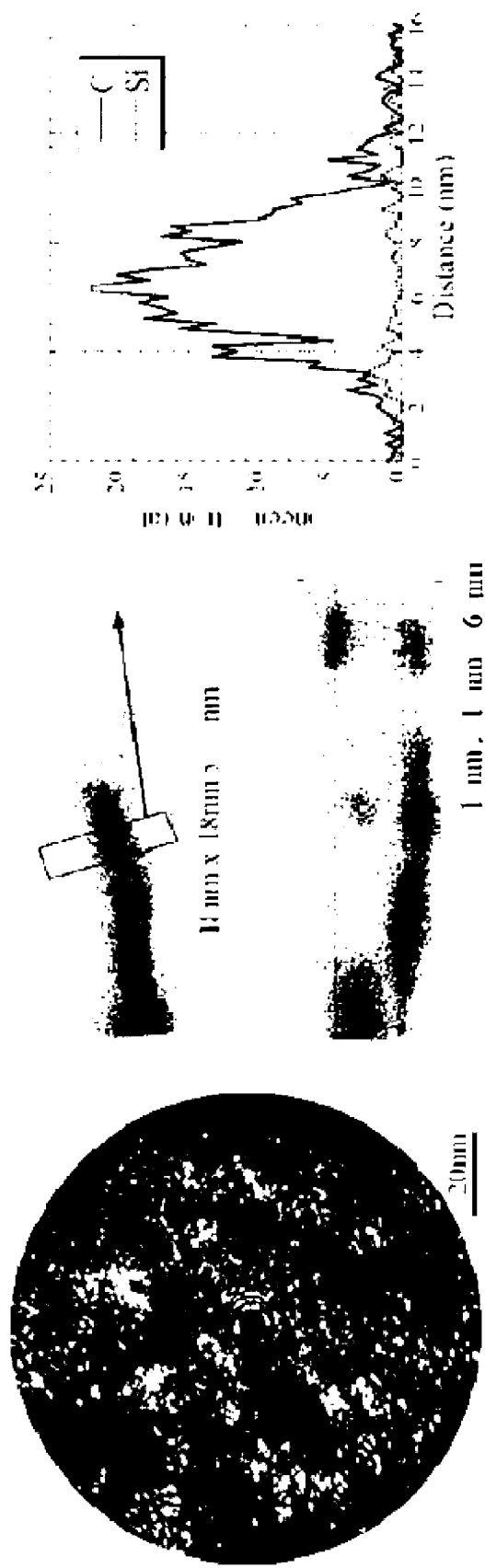

(Here, cementite denotes $Fe_3C$ that includes 6.67 wt % of C (carbon) in Fe matrix phase.) $Fe_3C$ may be converted as about 25 at %, and that the carbon concentration is lower than the carbon concentrate of the cementite, that is, 25 at %, denotes that the cementite region is decomposed and the carbon atoms are decomposed into the matrix phase, or C is integrated on dislocations or grain boundaries and a region having a high carbon concentration is shown.) That is, as the heating temperature increases from 150° C. to 200° C., carbon atoms are continuously diffused, and the region with high carbon concentration is regarded as a previous cementite region or a ferrite lamellar region with integrated dislocations. FIGS. 9A and 9B shows a state in which the heating process is performed at the temperature of 350° C. after the drawing process, and a noticeable difference is observed in FIGS. 9A and 9B as compared with the microstructure shown in FIGS. 8A and 8B. In the FIM image of FIG. 9A, bright and dark regions are clearly contrasted similarly to the FIM image of the wire that has undergone the drawing process but not the heating process as shown in FIG. 6A, but a dark lamellar region that is spheroidized is observed.

A small cementite or spheroidized carbon is generated along the grain boundary, and the carbon concentration in the ferrite is lower than that of the wire that is heated at a lower temperature.

That is, according to the result of observing the tensile strength and the microstructure according to the heating process at each temperature after the drawing process, at the heating temperature of 150° C. or less, interstitial solid atoms such as C and N are diffused and fixed at the dislocations under a cottrell effect, and thus, the tensile strength is increased and the wire that is hard to be plastic deformed after being wound on the winding portion may be obtained. However, when the heating temperature is 200° C. or greater, the tensile strength decreases due to the recovery of the microstructure and spheroidization of the cementite, which causes decrease in the cutting force that is a quality criteria of the wire, and thus, it is difficult to apply the heating process to the wire. Also, the heating process at the high temperature accompanies increase in manufacturing costs, and thus, the heating temperature may be at 150° C. or less.

As described above, the heating temperature during the heating process S200 is 200° C. or less, for example, 150° C. or less. (The heating temperature may range from 50° C. to 200° C.) Also, referring to FIG. 4, the heating temperature in the heating process S200 may range from 80° C. to 150° C. in order to increase the tensile strength. In the cooling process S300, the wire 110 that has undergone through the heating process S200 is cooled down.

Since the wire 110 that has undergone through the heating process S200 is exposed under an environment, in which C and N in the wire 110 are likely to be diffused, the strain aging may not be prevented when the wire 110 is wound without being sufficiently cooled down. Therefore, the cooling process S300 is performed to cool down the wire 110 that has undergone through the heating process S200.

A cooling temperature in the cooling process S300 may be 40° C. or less, that is, may range from 10° C. to 40° C. In more detail, the cooling process S300 may be performed at room temperature. The cooling process S300 may be performed by various methods, e.g., an air cooling type method, a water cooling type method, etc.

The winding process S400 is a process for winding the wire 110 that has undergone through the heating process S200 and the cooling process S300 on the winding portion 120 having a diameter that is greater than that of the wire 110. The diameter of the winding portion 120 is greater than 300 times the diameter of the wire 110, and when the diameter of the winding portion 120 is less than 300 times the diameter of the wire 110, there may be an issue when winding the wire 110. Therefore, the diameter of the winding portion 120 may be greater than 300 times the diameter of the wire 110.

Figure 10:
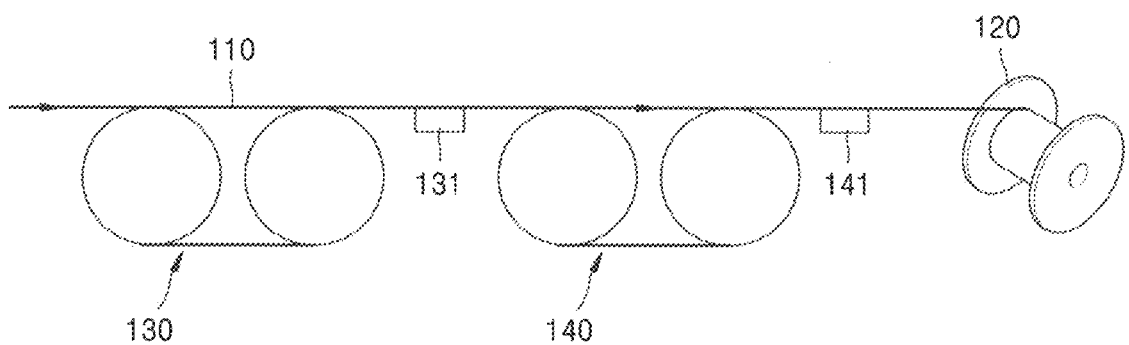
FIG. 10 is a diagram of a heating unit, a cooling unit, and a winding unit used in a method of manufacturing a steel cord and a single steel wire having an excellent straightness quality for reinforcing tire, according to an embodiment.

Referring to FIG. 10, the wire 110 undergoes through the heating process S200 in a heater 130 and the cooling process S300 in a cooler 140, and then is wound on the winding portion 120. Here, the heater 130 includes a first temperature sensor 131 in order to sense and adjust the temperature applied to the wire 110 in the heating process S200, and the cooler 140 includes a second temperature sensor 141 in order to sense and adjust the temperature applied to the wire 110 in the cooling process S300. The method of manufacturing the steel cord and single steel wire having excellent straightness quality for reinforcing tire according to the embodiment may further include the measuring process of the straightness (S500).

Figure 2:
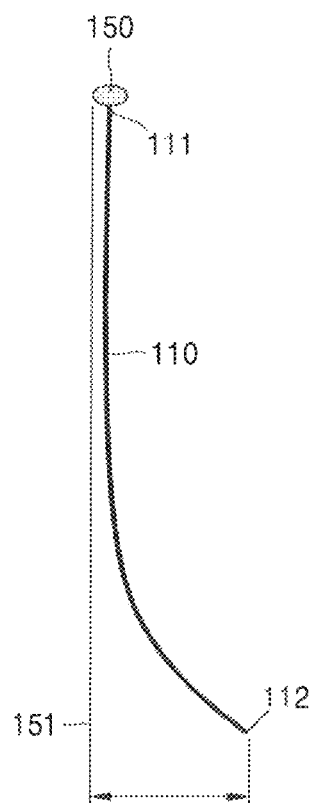
FIG. 2 is a diagram showing measurement of straightness of a wire according to an embodiment.

Referring to FIG. 2, in the measuring process of the straightness (S500), the end 111 of the wire 110 that has been wound on the winding portion 120 for six months to one year is fixed at the point 150, and then the wire 110 is pulled down vertically to 400 mm. The wire 110 that is wound on the winding portion 120 after undergoing through the heating process S200 and the cooling process S300 has been already strain aged in the heating process S200, and thus the strain aging no longer occurs even when the wire 110 is wound on the winding portion 120.

This may be identified in the measuring process of straightness (S500). In detail, in the measuring process of straightness (S500), a distance between the first axis 151 that is perpendicular to the point 150 and the opposite end 112 of the wire 110 may be 30 mm or less.

Since the wire 110 is heated in a state of being applied the tension in the heating process S200, the tension applied to the wire 110, the heating temperature of the wire 110, and a time taken to heat the wire 110 may vary. In order to accelerate the strain aging through the heating process S200, the heating temperature, the heating time, and the tension applied to the wire 110 in the heating process S200 may satisfy the condition A below.

Condition (A): $T+13.67 \ln(t)+2.7\tau \geq 425$ (In condition (A), T is an absolute temperature K of the heating temperature, t denotes the heating time s, and $\tau$ is the tension (kgf) applied to the wire)

When an upper limit of the condition A exceeds 600, it is inefficient in an economic aspect and a processability aspect, and thus the condition A may be $600 \geq T+13.67 \ln(t)+2.7\tau \geq 425$. When the heating process is performed with the heating temperature and the heating time satisfying the condition A above, the interstitial solid atoms, e.g., C and N, are sufficiently diffused and fixed at the dislocation, and thus, the strain aging is accelerated and deformation may not occur even when a long period time passes after winding the wire 110 on the winding portion 120.

When the heating process is performed for a time period that does not satisfy the condition A above at a predetermined temperature, a bend radius of the straightness of the wire 110 is less than that of right after the manufacturing, and when a tire manufacturing process is performed to use the wire 110 as a tire, a buckling or tip rising effect may occur.

Also, the tension applied to the wire 110 in the heating process S200 affects the heating temperature and the heating time.

As described above, the heating process S200 accelerates the strain aging by diffusing the interstitial solid atoms. When the tension applied to the wire 110 increases, the straightness of the wire 110 also increases and an excellent effect of improving straightness may be shown under the same heating condition.

Therefore, when the tension is applied to the wire 110 in the heating process S200, the heating temperature and the heating time may be reduced. FIGS. 11 and 12 are tables showing variations in straightness according to time after the heating and cooling processes are performed under the heating temperature, the heating time, and the tension applied to the wire 110 according to the condition A above. The wire 110 used in FIGS. 11 and 12 has a structure of 2×0.30. (The structure of 2×0.30 denotes a structure in which two wires each having a 0.3 mm diameter are combined.)

FIG. 11 shows the change in straightness according to the heating temperature and the heating time respectively when the tension is 0.5 kgf, 1 kgf, 2 kgf, and 4 kgf, and FIG. 12 shows the change in straightness according to the heating temperature and the heating time respectively when the tension is 6 kgf, 8 kgf, and 10 kgf. Here, the straightness (mm) is measured in the measuring process of straightness (S500). That is, the end 111 of the wire 110 is fixed at the point 150 and the wire 110 is vertically pulled down to 400 mm, and then a distance between the first axis 151 that is perpendicular to the point 150 and the opposite end 112 of the wire 110 is measured. Also, the change in the straightness denotes a difference between the straightness right after the manufacturing of the wire and the straightness seven months later. Referring to FIGS. 11 and 12, it may be understood that the straightness less changes as the tension, the heating temperature, and the heating time increase, and in a state in which the tension is 4 kgf or greater, the straightness less changes according to fixed conditions of the heating temperature and the heating time.

FIG. 13 shows changes in straightness in the steel cord according to the embodiment and a steel cord of the related art, which undergo through the heating process under the tension of 4 kgf and at the heating temperature 150° C. for two seconds. Referring to FIG. 13, change in the straightness in the steel cord according to the disclosure is greatly reduced as compared with the steel cord according to the related art, and this denotes that the straightness quality is improved. That is, when sufficiently high heating temperature and long heating time are applied, the interstitial solid atoms are actively diffused and strain aging is accelerated. Thus, even when the wire 110 is wound on the winding portion 120, the steel cord and single steel wire having less change in the straightness may be manufactured, and the straightness may be improved as the tension is high.

In detail, when the tension, the heating temperature, and the heating time satisfying the condition A above are applied, the steel cord and single steel wire having a straightness of 30 mm may be manufactured.

The steel cord and single steel wire having excellent straightness quality for reinforcing tire and the method of manufacturing the steel cord and single steel wire according to the disclosure may have the following effects. The stress remaining in the steel cord and single steel wire is removed by heating and cooling down the steel cord and single steel wire, and thus, the steel cord and single steel wire for reinforcing tire, wherein the steel cord and single steel wire have excellent straightness quality, that is, the straightness does not change even when the steel cord and the single steel wire are wound on the winding portion having a certain inner diameter for a long period of time, may be provided.

In detail, according to the disclosure, the strain aging of the steel cord and single steel wire may be accelerated by performing the heating process. It takes a few months to use the steel cord and single steel wire according to the related art as the tire reinforcing material, and to do this, the steel cord and single steel wire are wound on a spool having a certain inner diameter.

Then, strain aging may occur while the steel cord and the single steel wire according to the related art are being wound on the spool, which may cause straightness issue.

However, according to the disclosure, the strain aging that may occur while the steel cord and single steel wire are wound on the winding portion may be accelerated in advance through the heating process and the cooling process, and then the strain aging does not occur after winding the steel cord and single steel wire and the steel cord and single steel wire may have excellent straightness.

In addition, conditions of the heating process (heating temperature, heating time, and tension applied to the wire) in order not to change the straightness even when the wire is wound on the winding portion for a long period of time are obtained through the condition A above, and thus, the steel cord and single steel wire having excellent straightness quality for reinforcing tire may be provided. While the preferred embodiments of the present invention have been described in detail, it will be apparent to those skilled in the art that various modifications can be made to the above-described exemplary embodiments of the present invention without departing from the scope of the invention. Therefore, the scope sought to be protected of the disclosure shall be defined by the appended claims.

The invention claimed is:

1. A method of manufacturing a steel cord having excellent straightness quality for reinforcing tire, the method comprising:

preparing a wire that has been drawn;

heating the wire in a state in which tension is applied to the wire;

cooling down the wire; and winding the wire on a winding portion having a diameter that is greater than a diameter of the wire, wherein a heating temperature in the heating of the wire is 150° C. to 200° C., and a cooling temperature in the cooling of the wire is 40° C. or less, wherein the heating temperature, a heating time, and the tension applied to the wire during the heating of the wire satisfy condition A below, condition (A): $600 \geq T+13.67 \ln(t)+2.7\tau \geq 425$ (In condition (A), T is an absolute temperature K of the heating temperature, t denotes the heating time which is greater than 0 seconds, and $\tau$ is the tension (kgf) applied to the wire, $t>0$, $\tau \geq 1$).

2. A method of manufacturing a single steel wire having excellent straightness quality for reinforcing tire, the method comprising:

preparing a wire that has been drawn;

heating the wire in a state in which tension is applied to the wire;

cooling down the wire; and winding the wire on a winding portion having a diameter that is greater than a diameter of the wire, wherein a heating temperature in the heating of the wire is 150° C. to 200° C., and a cooling temperature in the cooling of the wire is 40° C. or less, wherein the heating temperature, a heating time, and the tension applied to the wire during the heating of the wire satisfy condition A below, condition (A): $600 \geq T+13.67 \ln(t)+2.7\tau \geq 425$ (In condition (A), T is an absolute temperature K of the heating temperature, t denotes the heating time which is greater than 0 seconds, and τ is the tension (kgf) applied to the wire, t>0, τ≥1).

\* \* \* \* \*